United States Patent [19]

Tomita et al.

[11] Patent Number: 5,113,348
[45] Date of Patent: May 12, 1992

[54] PAINT-OUT SHAPE DISPLAY METHOD AND AN APPARATUS USED IN A NUMERICAL CONTROL APPARATUS

[75] Inventors: Hiroki Tomita; Tomohiro Suzuki, both of Ooguchi, Japan

[73] Assignee: Kabushiki Kaisha Okuma Tekkosho, Aichi, Japan

[21] Appl. No.: 471,957

[22] Filed: Jan. 26, 1990

[30] Foreign Application Priority Data

Jan. 26, 1989 [JP] Japan .................................. 1-17257

[51] Int. Cl.⁵ ...................... G06F 15/46; G06G 7/64; G06G 7/66; G05B 19/42
[52] U.S. Cl. ................................ 364/474.26; 364/191; 364/474.24
[58] Field of Search ........... 364/474.24, 474.25, 364/474.26, 188, 191, 192, 521, 522; 340/723-729

[56] References Cited

U.S. PATENT DOCUMENTS

| | | | |
|---|---|---|---|
| 4,727,476 | 2/1988 | Ryouki | 364/474.25 |
| 4,788,636 | 11/1988 | Shiratori et al. | 364/191 |
| 4,791,579 | 12/1988 | Kranitzky | 364/474.24 |
| 4,792,889 | 12/1988 | Kragelin et al. | 364/474.24 |
| 4,802,083 | 1/1989 | Isobe et al. | 364/191 |
| 4,862,391 | 8/1989 | Ohhashi | 364/522 |
| 4,904,914 | 2/1990 | Seki et al. | 364/474.25 |
| 4,928,221 | 5/1990 | Belkhiter | 364/191 |

FOREIGN PATENT DOCUMENTS 0092807 4/1989 Japan .

Primary Examiner—Jerry Smith
Assistant Examiner—Jim Trammell
Attorney, Agent, or Firm—Wenderoth, Lind & Ponack

[57] ABSTRACT

A paint-out shape display method and an apparatus in a numerical control apparatus judges whether the inside of basic shapes divided for each shape element should be painted out or erased and in turn combines those basic shapes, thereby enabling a cross sectional shape of a rotating body to be displayed accurately. The cross sectional shape of the rotating body can be displayed properly, easily and at a high speed, and therefore the efficiency of a series of machining operations, beginning with program test, is greatly improved and a reduction in cost can be achieved.

2 Claims, 7 Drawing Sheets

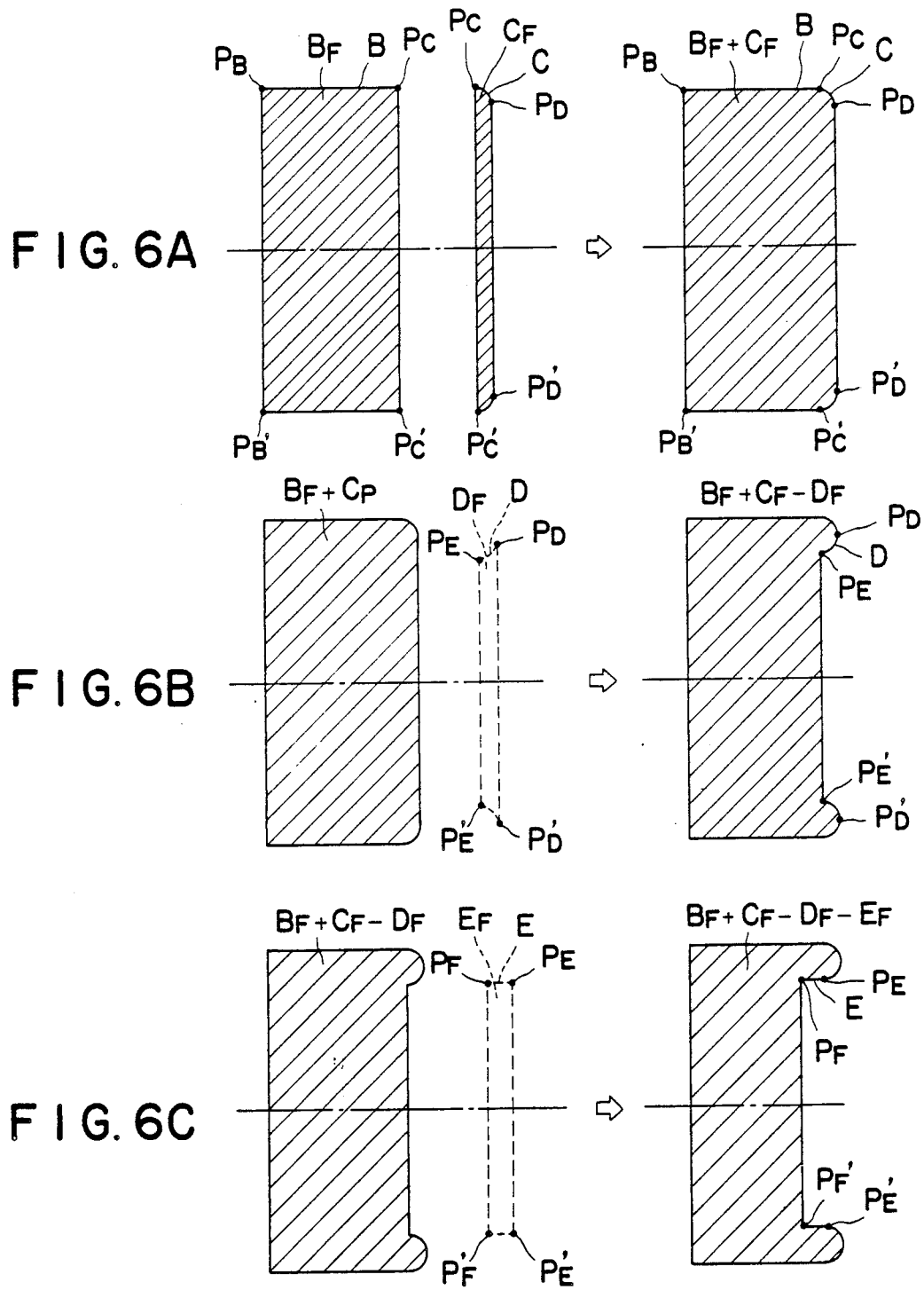

PAINT-OUT SHAPE DISPLAY METHOD AND AN APPARATUS USED IN A NUMERICAL CONTROL APPARATUS

BACKGROUND OF THE INVENTION

The present invention relates to a display method and an apparatus used in a numerical control apparatus in a case where the cross sectional shape of a material which is a rotating body is painted out and displayed.

For example, when machining tests of machining programs for lathes are carried out on a CRT screen of a numerical control apparatus, the cross sectional shape (hereinafter referred to as a "material shape") of the material must be displayed on the CRT screen. On that occasion, to make the material shape clear, the material shape is painted out.

FIG. 1 is a flowchart for explaining a paint-out shape display method in a numerical control apparatus of the prior art. For example, when a material shape, as shown in FIG. 2C, is displayed on a CRT screen, it is shown in the X-Z coordinates with the Z-axis as the center axis. As shown in FIG. 2A, shape elements a to j of the upper half only with respect to the center axis are input as the material shape element sequence (Step S1). A determination is then made as to whether or not an inner circumference exists in the material (Step S2). Since an inner circumference exists in this case, the material shape is separated into an outer circumference (solid line portion) and an inner circumference (dashed line) as shown in FIG. 2B (Step S3). Outer circumference basic shapes OF1 and OF2 are generated after the start points $P_b$ and $P_c$ and the end points $P_c$ and $P_d$ of the shape elements b, c of the outer circumference and their symmetrical points $P_b'$, $P_c'$ and $P_c'$ and $P_d'$ on the Z-axis are respectively connected to each other with striaght lines and those shapes are then divided by these lines (Step S4). The inside of the generated outer circumference basic shapes OF1 and OF2 are painted out and displayed on a CRT screen (Step S5). Similarly, inner circumference basic shapes IF1, IF2, IF3 and IF4 are generated after start points $P_e$, $P_f$, $P_g$, and $P_h$ and end points $P_f$, $P_g$, $P_h$, and $P_i$ of shape elements e,f,g, and h of the inner circumference and their symmetrical points $P_e'$, $P_f'$, $P_g'$, and $P_h'$ and $P_f'$, $P_g'$, $P_h'$, and $P_i'$ are respectively connected to each other with straight lines and the shapes are divided by these lines (Step S6). A material shape as shown in FIG. 2C can be displayed on the CRT after the inner circumference basic shapes generated in an outer circumference basic displayed on the CRT are combined and the inside of the inner circumference basic shape is erased (Step S7), thereby completing the whole process. On the other hand, when an inner circumference portion does not exist in the material at the above Step S2, it is assumed to be only shape elements of the outer circumference portion and the outer circumference basic shape is generated by the same process as that of the Step S4. The inside of the generated outer circumference basic shape is painted out and displayed on the CRT (Step S9), thus completing the whole process.

In the above-mentioned paint-out shape display method of a conventional numerical control apparatus, in a case of material shape seen in casting and so forth, there has been a problem in that the recess of the end surface composed of shape elements D, E, F, and G and the inner circumference portion composed of shape elements I, J, and K overlap and cannot properly be displayed on the CRT.

SUMMARY OF THE INVENTION

The present invention has been devised in light of the above-mentioned circumstances. An object of the present invention is to provide a paint-out shape display method in a numerical control apparatus and an apparatus used in such a method which is capable of painting out a cross sectional shape of a rotating body properly, easily, and at high speed and of displaying it.

According to one aspect of the present invention, for achieving the objects described above, there is provided a paint-out shape display method in a numerical control apparatus in a case where the cross sectional shape of a rotating body is painted out and displayed in a numerical control apparatus, comprising the steps of: generating a series of shape element sequences in which an end point of one shape element showing said cross sectional shape is a start point of the next shape element; generating a shape symmetric with respect to a specific axis for each of said shape elements; calculating an evaluation start point from a set of points whose coordinate values in said shape element sequence are a maximum or a minimum; judging whether the inside of said symmetric shape should be painted out or erased by comparing the coordinate value of the start point on said specific axis of each of said shape elements with the coordinate value of the end point on said specific axis which is disposed in a predetermined direction from the calculated evaluation start point; and painting out said cross sectional shape and displaying it by combining said symmetric shapes processed according to the judgment step.

According to another aspect of the present invention, there is provided a paint-out shape display apparatus by which the cross sectional shape of a rotating body is painted out and displayed in a numerical control apparatus, comprising: a means for generating a shape symmetric with respect to a specific axis divided for each of said shape elements; a means for calculating an evaluation start point from a set of points whose coordinate values in said shape element sequence are a maximum or a minimum; a means for judging whether the inside of said symmetric shape should be painted out or erased by comparing the coordinate value of the start point on said specific axis of each of said shape elements with the coordinate value of the end point on said specific axis which is disposed in a predetermined direction from the calculated evaluation start point; and a means for painting out said cross sectional shape and displaying it by combining said symmetric shapes processed according to the judgment step.

The nature, principle and utility of the invention will become more apparent from the following detailed description when read in conjunction with the accompanying drawings.

BRIEF DESCRIPTION OF THE DRAWINGS

These and other objects, features and advantages of the present invention will become clear by the following description of a preferred embodiment of the present invention with reference to the accompanying drawings, wherein:

FIGS. 6A to 6F are views for illustrating the flow in the case where the example of the material shape shown in FIG. 5 is displayed by the method of the present invention.

DETAILED DESCRIPTION OF THE PREFERRED EMBODIMENTS

Figure 1:
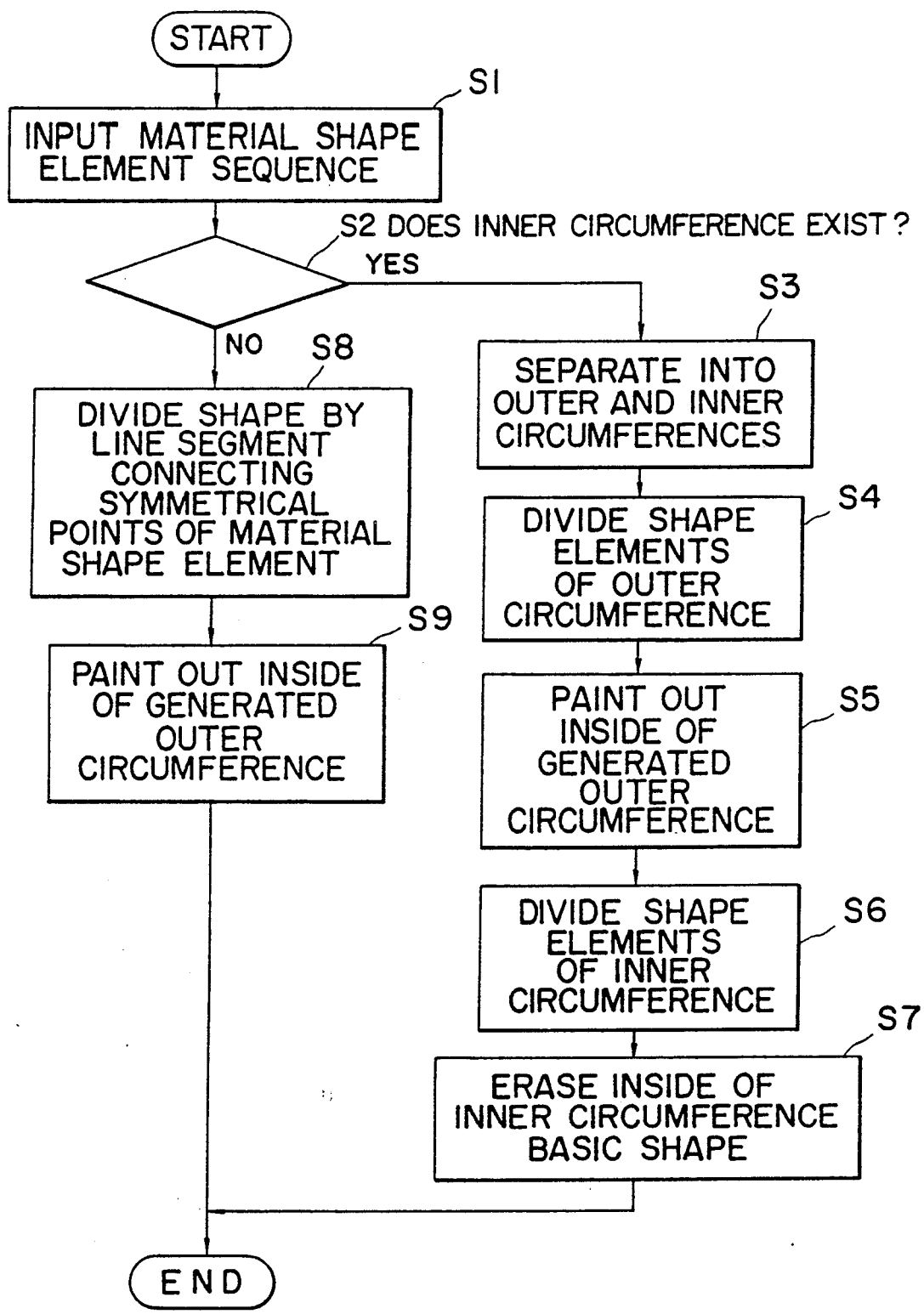
FIG. 1 is a flowchart for explaining an example of the operation of a paint-out shape display method in a numerical control apparatus of the prior art.
Figure 2A:
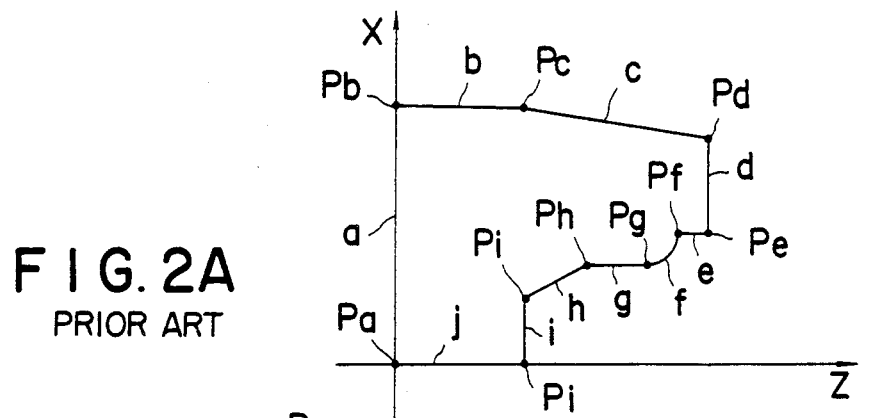
FIGS. 2A to 2C are views for illustrating the flow in the case where a material shape is displayed by means of the prior art apparatus.
Figure 2B:
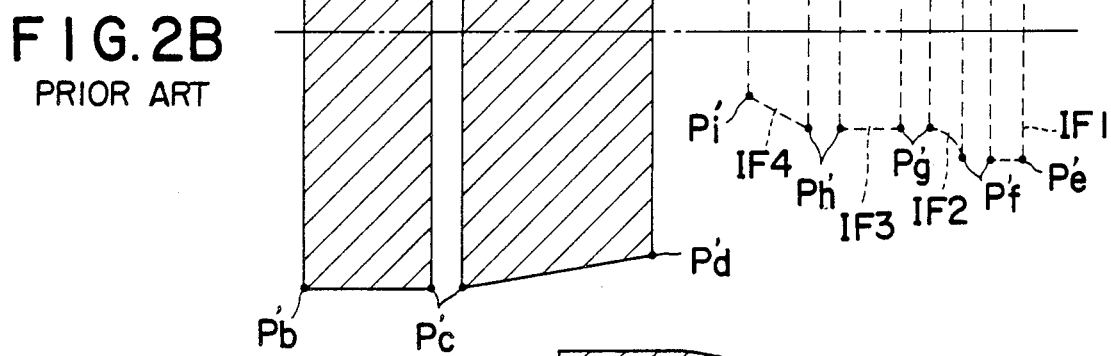
Figure 2C:
Figure 3:
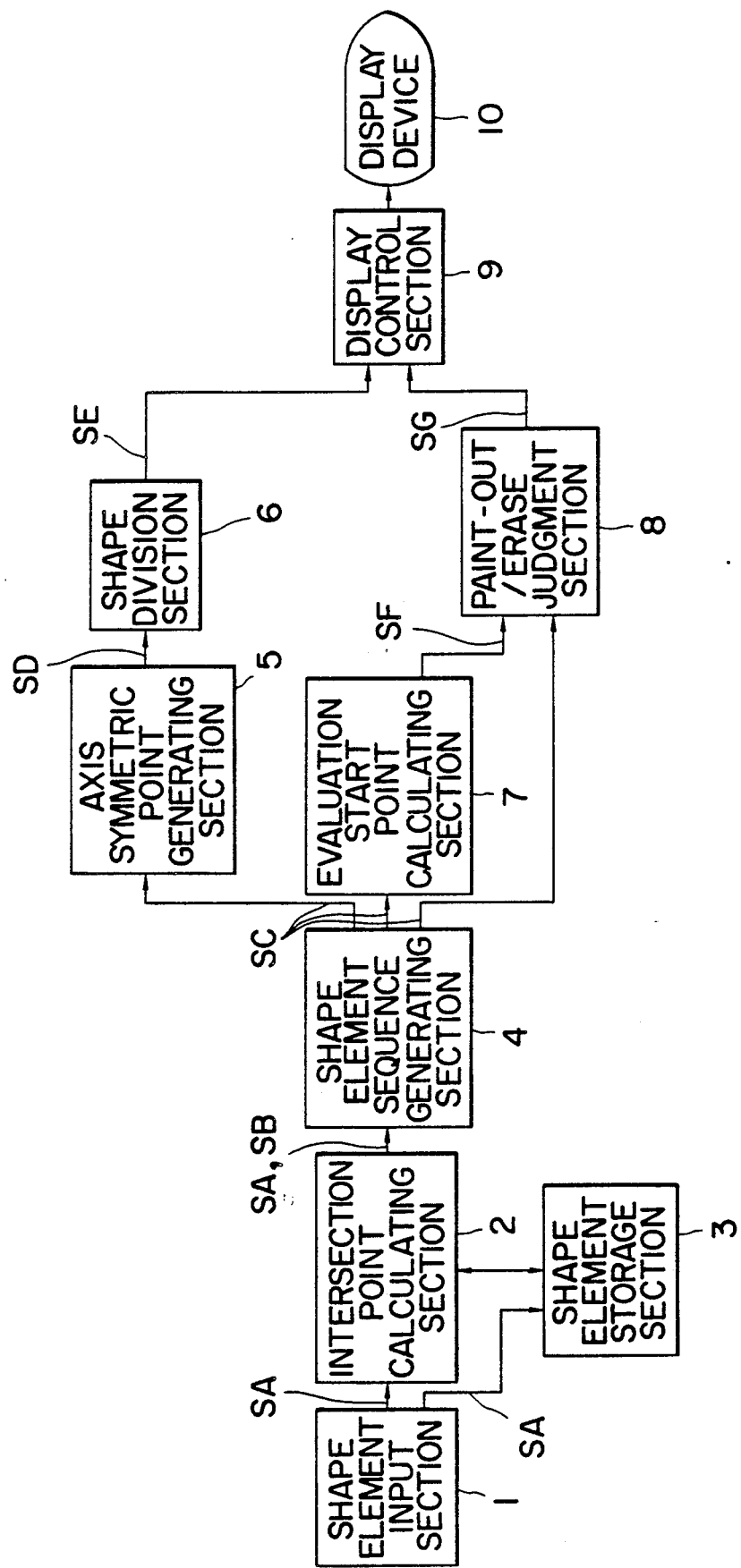
FIG. 3 is a block diagram illustrating one example of an apparatus for achieving a paint-out shape display method in the numerical control apparatus of the present invention.

FIG. 3 is a block diagram for illustrating one example of an apparatus for realizing a paint-out shape display method in the numerical control apparatus of the present invention. An intersection point SB for determining the material shape uniquely on the basis of a shape element SA of a material shape of the upper half only with respect to the center axis which is input from a shape element input section 1 is calculated in an intersection point calculating section 2, and the calculated intersection point SB and the above-mentioned shape element SA are stored in a shape element storage section 3. A series of a material shape element sequence SC which is in a closed form and whose termination of the preceding shape element is the start point of the next shape element is generated in a shape element sequence generating section 4 by the intersection point SB and the shape element SA. A point sequence SD symmetric with respect to the Z-axis is generated in an axis symmetric point generating section 5 by the generated material shape element sequence SC. The start point and the end point of the shape element and their symmetric points with respect to the Z-axis are connected to each other with straight lines and the material shape is divided into a basic shape SE in a shape division section 6. On the other hand, a specific point (an evaluation start point) SF is calculated in an evaluation start point calculating section 7 by the material shape element sequence SC generated in the shape element sequence generating section 4. A judgment of whether the inside of a basic shape for each shape element is painted out and displayed or erased is made in a paint-out/erase judgment section 8 by checking in turn the material shape element sequence SC in a certain direction (clockwise or counter-clockwise) from the evaluation start point SF. On the basis of the judgment result of the paint-out/erase judgment section 8, a basic shape SE determined in the shape division section 6 is graphically displayed on a display device 10 such as a CRT via a display control section 9.

Figure 4:
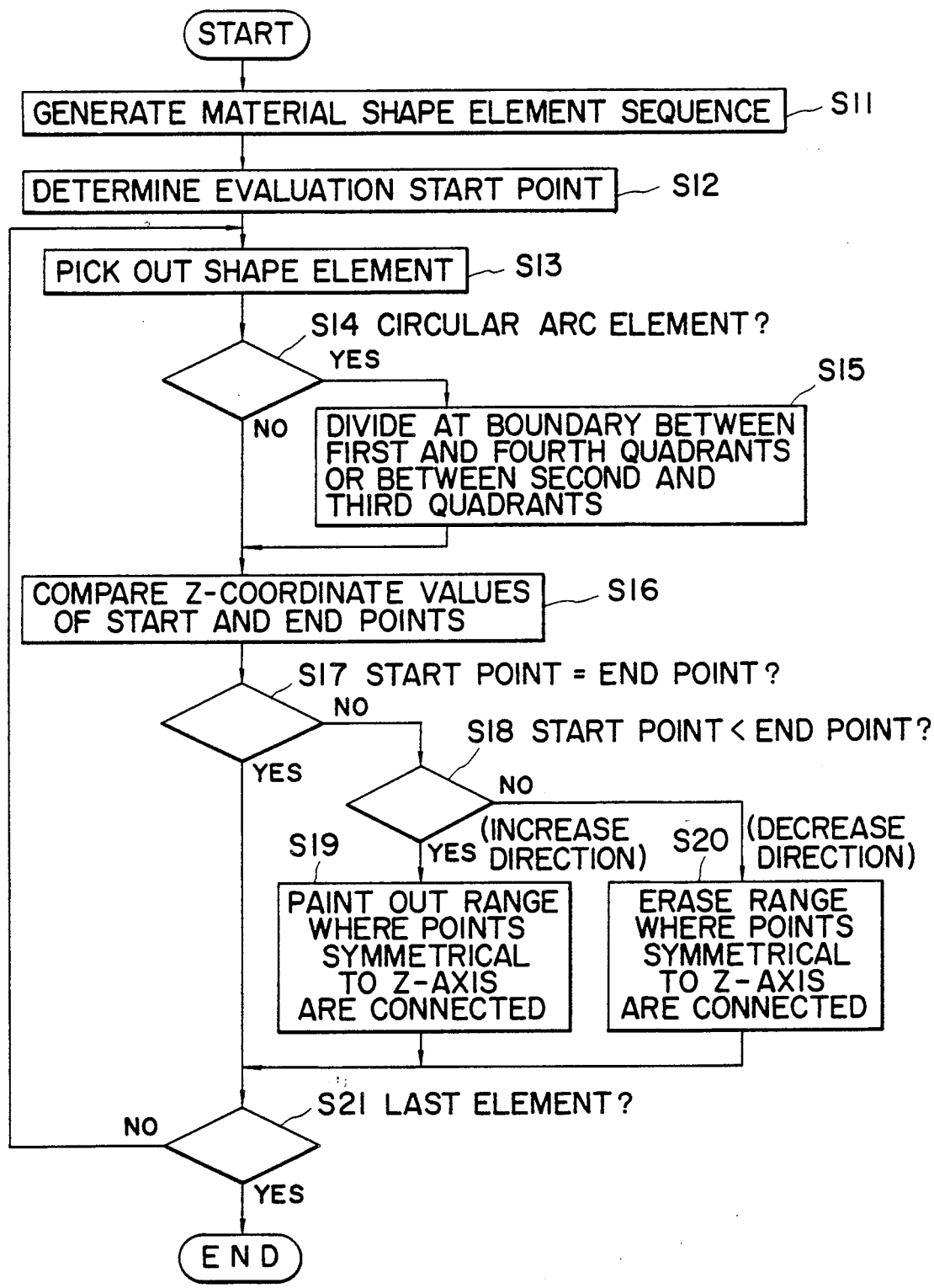
FIG. 4 is a flowchart for explaining an example of the operation of the present invention.
Figure 5:
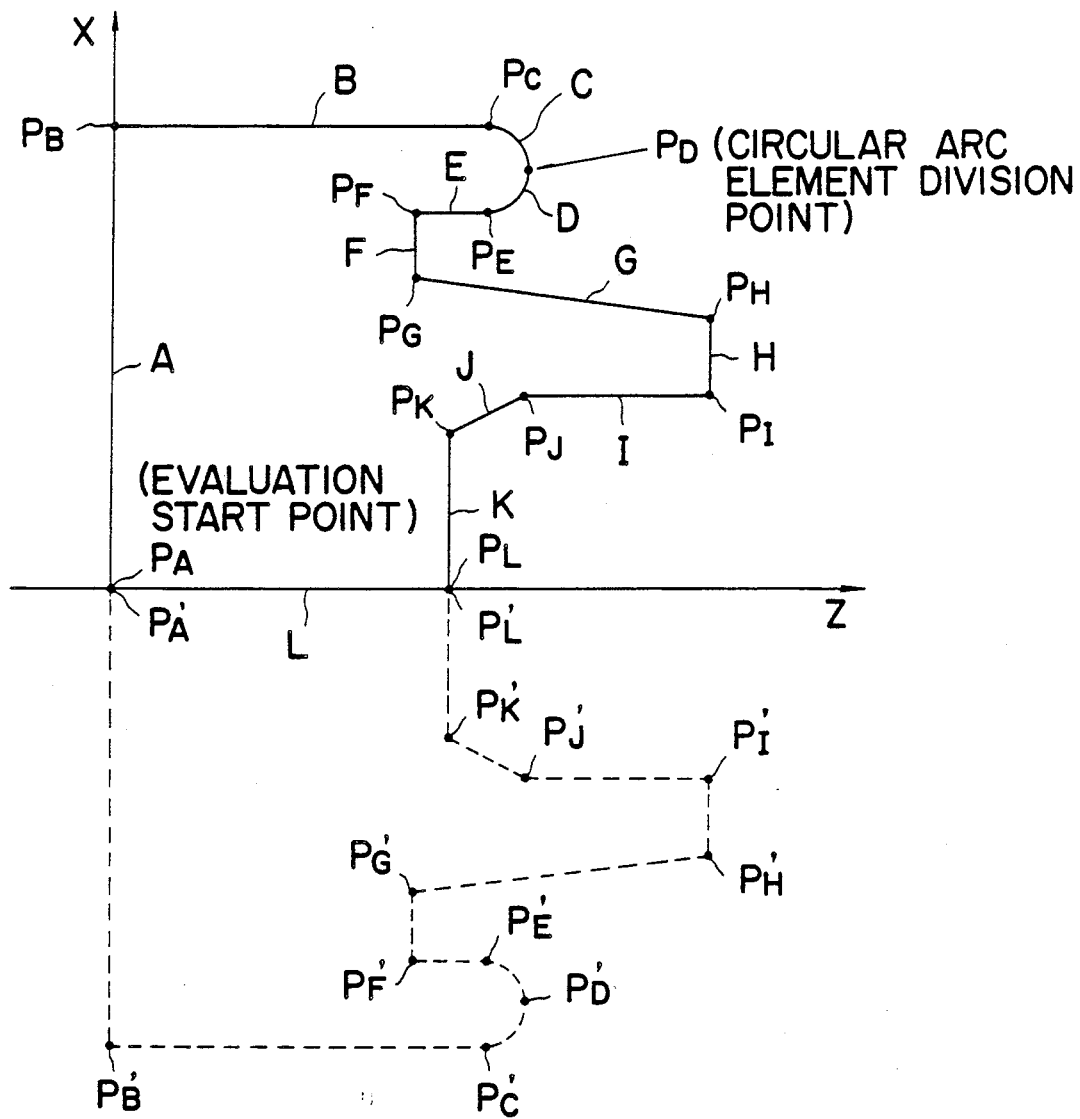
FIG. 5 is a view for illustrating a specific example of a material shape.

An example of the operation in such an above-described structure will be explained with reference to the flowchart in FIG. 4. In the case of a material shape as shown in FIG. 5, for example, the intersection point calculating section 2 calculates intersection points $P_A$, $P_B$, ..., $P_L$ for uniquely determining the material shape on the basis of a shape element input by the operator or the like. The shape element sequence generating section 4 generates a material shape element sequence A to L (however, C and D should be one shape element) by the calculated intersection points $P_A$, $P_B$, ..., $P_L$ (Step S11).

The evaluation start point calculating section 7 determines a point $P_A$ (origin in the X-Z coordinates) in which the X-coordinate value becomes a minimum value from among a set of points in which the Z-coordinate value becomes a minimum value among the point sequence forming the generated material shape element sequence A to L as an evaluation start point (Step S12). The paint-out/erase judgment section 8 picks out shape elements in turn clockwise (in the order of A→B→C, D→E→... L) from the evaluation start point $P_A$ (Step S13) and performs the following processes.

A confirmation of whether or not the picked-out shape element is a circular arc element is made (Step S14). In the case of "yes", the circular arc element is divided at the boundary between the first quadrant and the fourth quadrant or between the second quadrant and the third quadrant (Step S15). When the shape element picked out in the above-mentioned judgment at the Step S14 is not a circular arc element or the circular arc element is divided (Step S15), respective Z-coordinate values of the start point and the end point (determined clockwise from the evaluation start point) of the shape element are compared with each other (Step S16). When the Z-coordinate value of the start point is equal to the Z-coordinate value of the end point, the operation proceeds to the Step S21 (Step S17). When the Z-coordinate value of the start point is smaller than the Z-coordinate value of the end point, namely, toward an increase direction (Step S18), the inside of a basic shape formed by connecting the start and end points and their symmetric points with respect to the Z-axis to each other with straight lines is painted out and displayed (Step S19), and the operation proceeds to the Step S21. On the other hand, when the Z-coordinate value of the start point is greater than the Z-coordinate value of the end point, namely, toward a decrease direction (Step S18), the inside of a basic shape formed by connecting the start and end points and their symmetric points with respect to the Z-axis is erased (Step S20), the operation proceeds to the Step S21. A confirmation of whether or not the operation is finished for the last shape element is made (Step S21). In the case of "no" at the Step S21, the operation returns to the step S13 and the above-mentioned operation is repeated. In the case of "yes", the operation completes the whole process.

Figure 6D:
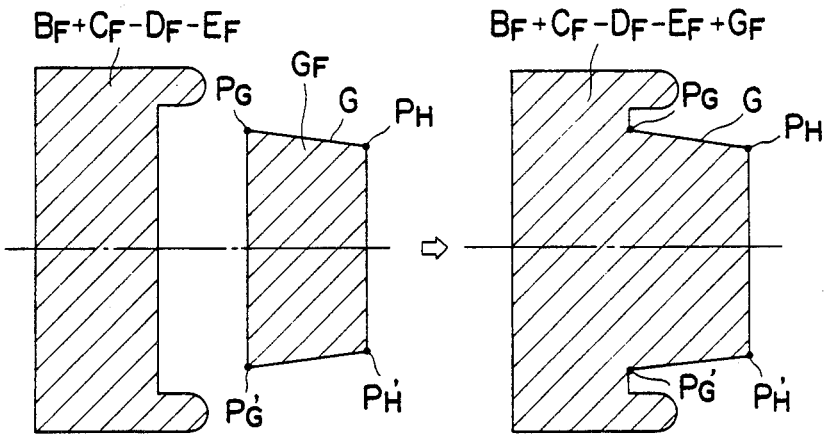
Figure 6E:
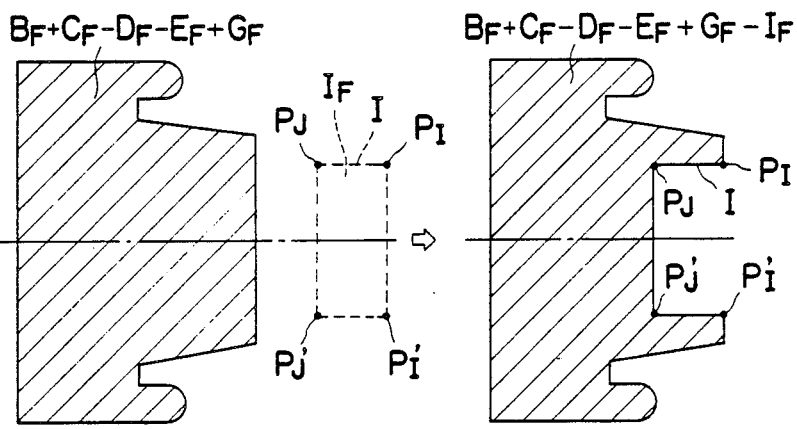
Figure 6F:
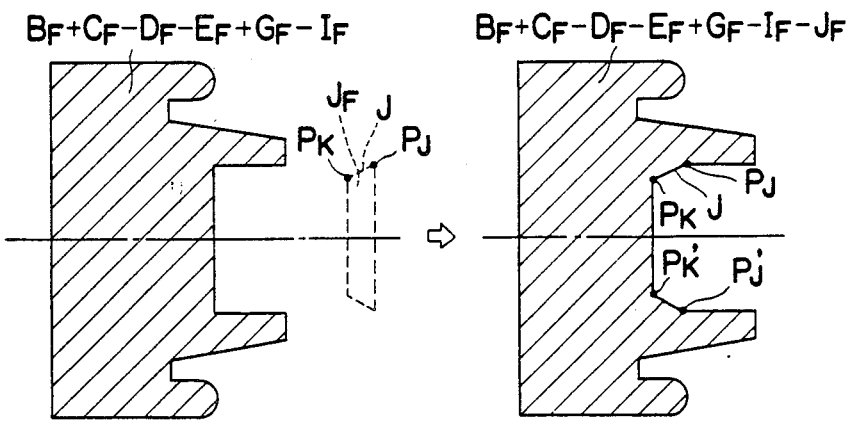

At this point, the process of the Step S14 and those that follow will be explained using a material shape shown in FIG. 5. First, since the shape element A is not a circular arc element, respective Z-coordinate values of the start point $P_A$ and the end point $P_B$ of the shape element A are compared with each other. Since the Z-coordinate value of the start point $P_A$ is equal to the Z-coordinate value of the end point $P_B$, no action is performed, and respective Z-coordinate values of the start point $P_B$ and the end point $P_C$ of the shape element B (this is not a circular arc element either) are compared with each other. Since the Z-coordinate value of the start point $P_B$ is smaller than the Z-coordinate value of the end point $P_C$, the inside of basic shape $B_F$ ($P_B P_C P_C' P_B'$) formed by connecting the start point $P_B$ and the end point $P_C$, and their symmetric points $P_B'$ and $P_C'$ with respect to the Z-axis to each other with straight lines is painted out and displayed (FIG. 6A). Next, since the shape elements C and D are circular arc elements, they are divided into two shape elements C and D at a circular arc element division point $P_D$ which is a boundary between the first quadrant and the fourth quadrant. Then, respective Z-coordinate values of the start point $P_C$ and the end point $P_D$ of the shape element C are compared with each other. Since the Z-coordinate value of the start point $P_C$ is smaller than the Z-coordinate value of the end point $P_D$, the inside of the basic shape $C_F(P_C P_D P_D' P_C')$ formed by connecting the start point $P_C$ and the end point $P_D$, and their symmetric points $P_C'$ and $P_D'$ with respect to the Z-axis to each other with straight lines is painted out and displayed (FIG. 6A). At this point, as shown in FIG. 6A, a shape $(B_F+C_F)$ formed of a combination of basic shapes $B_F$ and $C_F$ can be generated. Next, respective Z-coordinate values of the start point $P_D$ and the end point $P_E$ of the shape element D are compared with each other. Since the Z-coordinate value of the start point $P_D$ is smaller than the Z-coordinate value of the end point $P_E$, the inside of basic shape $D_F(P_D P_E P_E' P_D')$ formed by connecting the start point $P_D$ and the end point $P_E$, and their symmetric points $P_D'$ and $P_E'$ with respect to the Z-axis to each other with straight lines is erased, then a shape $(B_F+C_F-D_F)$ formed by erasing $D_F$ from a basic shape $(B_F+C_F)$ can be generated, as shown in FIG. 6B. Following this, the above-mentioned operation is repeated (FIGS. 6C→6D→6E→6F), and finally, a shape $(B_F+C_F-D_F-E_F+G_F-I_F-J_F)$ as shown in FIG. 6A can be displayed.

In the above-mentioned embodiment, the paint-out/erase of the inside of a basic shape is displayed for each judgment. However, the judgment result is stored in a buffer and so forth, and it may be displayed in turn after all shape elements are evaluated. For an evaluation start point, a point which is a minimum for both the X- and Z-coordinate values may be used. However, a point whose Z-coordinate value is a maximum or minimum or whose X-coordinate value is a maximum or minimum may be used.

As set forth hereinabove, according to the paint-out shape display method in the numerical control apparatus and the apparatus of the present invention, the cross sectional shape of the rotating body can be displayed properly, easily and at high speed, and therefore the efficiency of a series of machining operations, beginning with program test, is greatly improved and a reduction in cost can be achieved.

As many apparently windely different embodiments of this invention may be made without departing from the spirit and scope thereof, it is to be understood that the invention is not limited to the specific embodiment thereof except as defined in the appended claims.

What is claimed is:

1. A paint-out shape display method in a numerical control apparatus in a case where the cross sectional shape of a rotating body is painted out and displayed in a numerical control apparatus, comprising the steps of;
   generating a series of shape element sequences in which an end point of one shape element showing said cross sectional shape is a start point of the next shape element;
   generating a shape symmetric with respect to a specific axis for each of said shape elements;
   calculating an evaluation start point from a set of points whose coordinate values in said shape element sequence are a maximum or a minimum;
   judging whether the inside of said symmetric shape should be painted out or erased by comparing the coordinate value of the start point on said specific axis of each of said shape elements with the coordinate value of the end point on said specific axis which is disposed in a predetermined direction from the calculated evaluation start point; and
   painting out said cross sectional shape and displaying it by combining all of said symmetric shapes processed according to the judging step.

2. A paint-out shape display apparatus by which the cross sectional shape of a rotating body is pained out and displayed in a numerical control apparatus, comprising;
   a means for generating a series of shape element sequences in which an end point of one shape element showing said cross sectional shape is a start point of the next shape element;
   a means for generating a shape symmetric with respect to a specific axis for each of said shape elements;
   a means for calculating an evaluation start point from a set of points whose coordinate values in said shape element sequence are a maximum or a minimum;
   a means for judging whether the inside of said symmetric shape should be painted out or erased by comparing the coordinate value of the start point on said specific axis of each of said shape elements with the coordinate value of the end point on said specific axis which is disposed in a predetermined direction from the calculated evaluation start point; and
   a means for painting out said cross sectional shape and displaying it by combining all of said symmetric shapes processed according to the judging step.

* * * * *